(12) United States Patent
Watts, Jr. et al.

(10) Patent No.: US 6,801,974 B1
(45) Date of Patent: Oct. 5, 2004

(54) METHOD OF FILTERING EVENTS IN A COMBINATIONAL COMPUTING DEVICE

(75) Inventors: La Vaughn F. Watts, Jr., Austin, TX (US); Ronald D. Shaw, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 417 days.

(21) Appl. No.: 09/770,428

(22) Filed: Jan. 26, 2001

(51) Int. Cl.⁷ .............................................. G06F 13/00
(52) U.S. Cl. ...................................... 710/303; 710/315
(58) Field of Search ................................. 710/315, 303, 710/104; 713/300, 310, 320–324

(56) References Cited

U.S. PATENT DOCUMENTS

| | | | |
|---|---|---|---|
| 5,423,045 A | * 6/1995 | Kannan et al. | ............ 713/322 |
| 5,590,338 A | 12/1996 | Parks et al. | |
| 5,608,884 A | 3/1997 | Potter | |
| 5,742,794 A | 4/1998 | Potter | |
| 5,809,262 A | 9/1998 | Potter | |
| 6,292,181 B1 | * 9/2001 | Banerjee et al. | ............ 345/179 |
| 6,523,079 B2 | * 2/2003 | Kikinis et al. | .............. 710/303 |
| 6,571,308 B1 | * 5/2003 | Reiss et al. | .................. 710/315 |

\* cited by examiner

Primary Examiner—Khanh Dang

(57) ABSTRACT

A method for filtering events in a computing system using a low power device, Personal Data Assistant is provided. The filtering is done without the involvement of the processor of the computing system. The filtering of events include authorizing requests from wireless devices before the processor's resources are utilized. In a mobile computing system, pre filtering by low power device reduces the amount of time the processor needs to be active. The personal digital assistant also provides certain functionality of computing system and access to the resources of computing system without bringing up the system in a full power mode. When the processor is in active state, the personal digital assistant continues to authorize access requests from wireless device and also provides a peer-to-peer communication and exchange of general information with other wireless devices.

26 Claims, 3 Drawing Sheets

METHOD OF FILTERING EVENTS IN A COMBINATIONAL COMPUTING DEVICE

CROSS-REFERENCES TO RELATED APPLICATIONS

This application is related to commonly assigned patent application Ser. No. 09/740,138, filed Dec. 18, 2000 and entitled "A COMBINATION PERSONAL DATA ASSISTANT AND PERSONAL COMPUTING DEVICE" having La Vaughn F. Watts, Jr. and Ronald D. Shaw as inventors.

BACKGROUND OF THE INVENTION

1. Field of the Invention

This invention relates generally to computing systems with wireless radio devices and more particularly to mobile computing systems with wireless interface for data processing with peripheral devices. This invention relates to the field of wireless peripheral data processing by a mobile computing system.

2. Description of the Related Art

The Computing systems incorporate a variety of wireless interfaces with multiple technological standards to provide services to wireless peripheral devices. To service a request from wireless device, the computing system, first validate the request before servicing the request. If the request is from an unauthorized device then the computing system rejects the service request. Every time a computing system receives a service request from a device, the processor of the computing system acknowledges the request and upon validation check, either provides the service or rejects the request. The process of answering a service call from wireless peripheral devices requires that the processor must be in an active state. For the processor to be active, the computing system must be in a fully powered mode.

Mobile computing systems have limited battery resources and generally stay in a low power sleep state until fully powered processing is required by a user. Every time a service request is received from an unauthorized device, the processor of mobile computing system comes out of the sleep state and performs the validation check. If the device requesting the service is unauthorized to use the computing resources, the processor will reject the request and go back to inactive or sleep state. In an environment where multiple wireless devices are in operation, the processor is constantly interrupted for service requests from unauthorized devices. Even though, when a user is not using the computing system in full power mode, these wireless service interruptions still cause processor to constantly utilize full power of the computing system. This consumes critical battery resources of mobile computing system. Thus, it is necessary to limit service calls from unauthorized wireless peripheral devices so that the critical processing and power resources of processor are reserved for application processing by the user.

When the computing system is in a fully powered state, the validation process takes valuable processing bandwidth of the processor, which slows processor's response to other authorized wireless and internal input output devices. With the current implementation of technology, processor must respond to every service request and thus loose valuable processing bandwidth and in case of mobile computing system, loose critical battery resources. The computing systems are extremely mobile and more and more wireless devices interact with the computing systems. With the growth of technology and interoperability of incompatible wireless standards for peripheral devices, a need has been felt to improve the functioning and efficiency of mobile computing devices.

Low power devices such as Personal Data Assistant (PDA) have been developed to take advantage of operating systems (OS) such as Palm® OS and Windows® CE. These operating systems, in conjunction with a PDA system, permit a reduced or specialized functionality computing system. Typically, these PDAs are relatively small and can perform a variety of useful functions such as arrange calendars; schedule appointments; send and receive e-mail; provide presentations; create documents; and provide communications. The PDA operating systems can permit exchange of files between the PDA systems and a computing system with Microsoft Windows® files. While the reduced functionality can be a disadvantage of the PDA system, this system has several advantages. The reduced functionality and absence of disk storage extends the time between battery recharges.

SUMMARY OF THE INVENTION

The present invention provides a solution by incorporating multiple systems in a combination of computing system with pre-filtering of certain power consuming events by a low powered device. Low power device such as PDA is used to perform the overhead and pre-wakeup functions such as validation of wireless resources requested by a peripheral device, quick look up of certain data, email and like. In one embodiment, present invention utilizes a Personal Data Assistant (PDA), incorporated in a computing system, to perform the validation of requests by wireless peripheral devices. When a new wireless device enters the wireless working environment or wireless zone of mobile computing system and requests service from the computing system, PDA acknowledges all service requests and validates the requests without awakening the processor or bringing up processor in an active mode. PDA performs authorization and validation function even when the processor is in active state and the computing system is fully powered. In another embodiment, PDA performs peer to peer communication with various wireless devices within its environment without the interruption of computing system. This allows a client-to-client or server-to-server type communication by the computing system without a client-server type interaction.

In another embodiment of present invention, PDA provides limited computing system functionality for the user. The user can utilize certain computing resources of the computing system without bringing up the entire system in active state. The user can provision the types of services provided by the PDA based on the configuration and available resources of the computing system. However, the provisioning can also be done dynamically by the PDA or the processor.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and it's numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention, which is defined in the claims following the description.

Computing System

Figure 1:
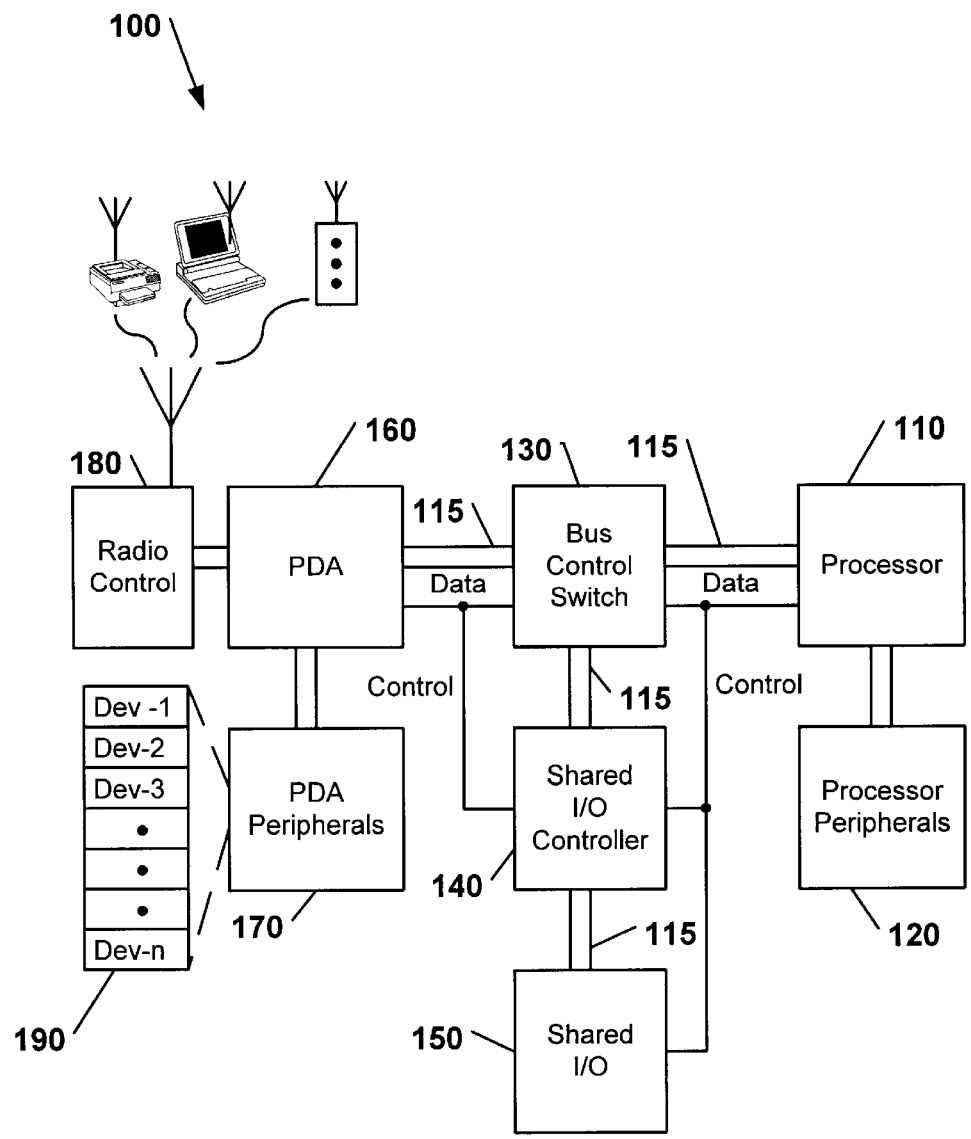
FIG. 1 is block diagram of a computing system according to the present invention.

FIG. 1 illustrates the computing system used according to an embodiment of current invention. The computing system 100 has a processor 110 with associated peripherals 120 such as boot Read Only Memory (ROM), Flash devices and such. Data bus 115 is connected to a Bus Control Switch (BCS) 130. BCS provides access through Shared Super Input Output Controller (SIO) 140 to shared peripheral devices 150. The share peripherals include keyboard, mouse, printer, modem and the like. These peripheral devices are shared between the processor 110 and PDA 160. PDA is connected to certain peripheral devices 170 such as flash memory, battery and the like. PDA peripherals 170 include a lookup table or database 190 which stores provisioning information such as a list of authorized devices, priority schemes, pre wakeup function list and like. PDA 160 is also connected to a Radio Control device 180. The radio control device 180 provides wireless interface between the computing system and peripheral wireless devices.

A user typically defines the functions to be performed by the PDA 160. PDA 160 has access to shared peripheral devices 150, which can be used to perform user-defined functions. The combination of PDA 160 and shared devices 150 allow the computing system to come up in an initial functionality mode or "instant-on" mode without utilizing the main computing system 100 power resources. Because there is continuous power to the PDA 160 system and because the PDA 160 boots from a flash memory, the user sees an instant interface to the computing system 100. The extent of this functionality depends upon the configuration of the computing system 100, available resources for the computing system 100 and the PDA 160.

Radio control 180, interfaces with all the wireless peripheral devices that may need service from the computing systems. Wireless peripheral devices may include wireless printer, wireless Local Area Network client/server interfaces, Ethernet hubs, personal communication devices, other mobile computing devices and such. These devices may incorporate multiple wireless standards including proprietary standards. Radio control 180 can be capable of communicating with multiple devices regardless of the interface technology.

In an event, when a wireless device requests communication, Radio control 180 forwards the request to PDA 160. PDA 160 answers the request and determines if the request needs to be served or rejected. Upon that determination, PDA 160 either wakes up the processor 110 by sending an interrupt request or PDA 160 performs limited requested functions using BCS 130, SIO controller 140 and the shared peripheral devices 150. All the low power processing is done by PDA 160 and the processor 110 is only interrupted when the data processing requires processor 110 resources.

Provisioning

The user has an option to define the types of services performed by the PDA 160. A process referred to herein as 'provisioning'. During the provisioning of the computing system, a user chooses the services which the user prefers PDA 160 to perform before utilizing full power of the computing system 100 or during the active state of the computing system 100. These services typically include quick calendar check, personal data lookup (phone numbers, addresses, etc.), email header scan, certain alarms and importantly, screening of requests from wireless peripheral devices. The PDA 160 can be provisioned to perform additional security function for the computing system such as login related authorization checks and like. The user determines the priority of the provisioned services to be performed by the PDA 160 in the case of a resource overload. In resource overload situation, low priority requests can be ignored by PDA 160 without awakening the processor. This prioritization can also be performed dynamically by the PDA 160 based on a priority algorithm defined by the user.

Database or Lookup Tables

The user determines the types of devices the computing systems will serve. A database or lookup table 190 is established to store the identification of devices that will be allowed to communicate with the computing system. The database 190 is stored in the PDA peripheral 170. When a wireless service request is detected, the radio control 180 forwards the request to PDA 160 and PDA 160 scans its lookup table 190 to determine if the device is authorized to communicate.

The database scheme of authorized wireless devices is typically organized in a multiple tier form. The computing system 100 is exposed to a frequently changing wireless environment, especially, if the computing system 100 is a mobile computing system. Thus depending upon the wireless environment, PDA 160 can select an appropriate lookup table. For example, if the computing system is in an office environment, the PDA 160 selects a set of lookup tables for authorized devices typically used in an office environment such as LAN interfaces, personal devices, printers and like. But when the computing system is in transit, say at the airport, on the street, in a department store etc., detecting such environment, PDA 160 can automatically refer to a different set of lookup table with different criteria for device authorization.

Functional Processing

Figure 2:
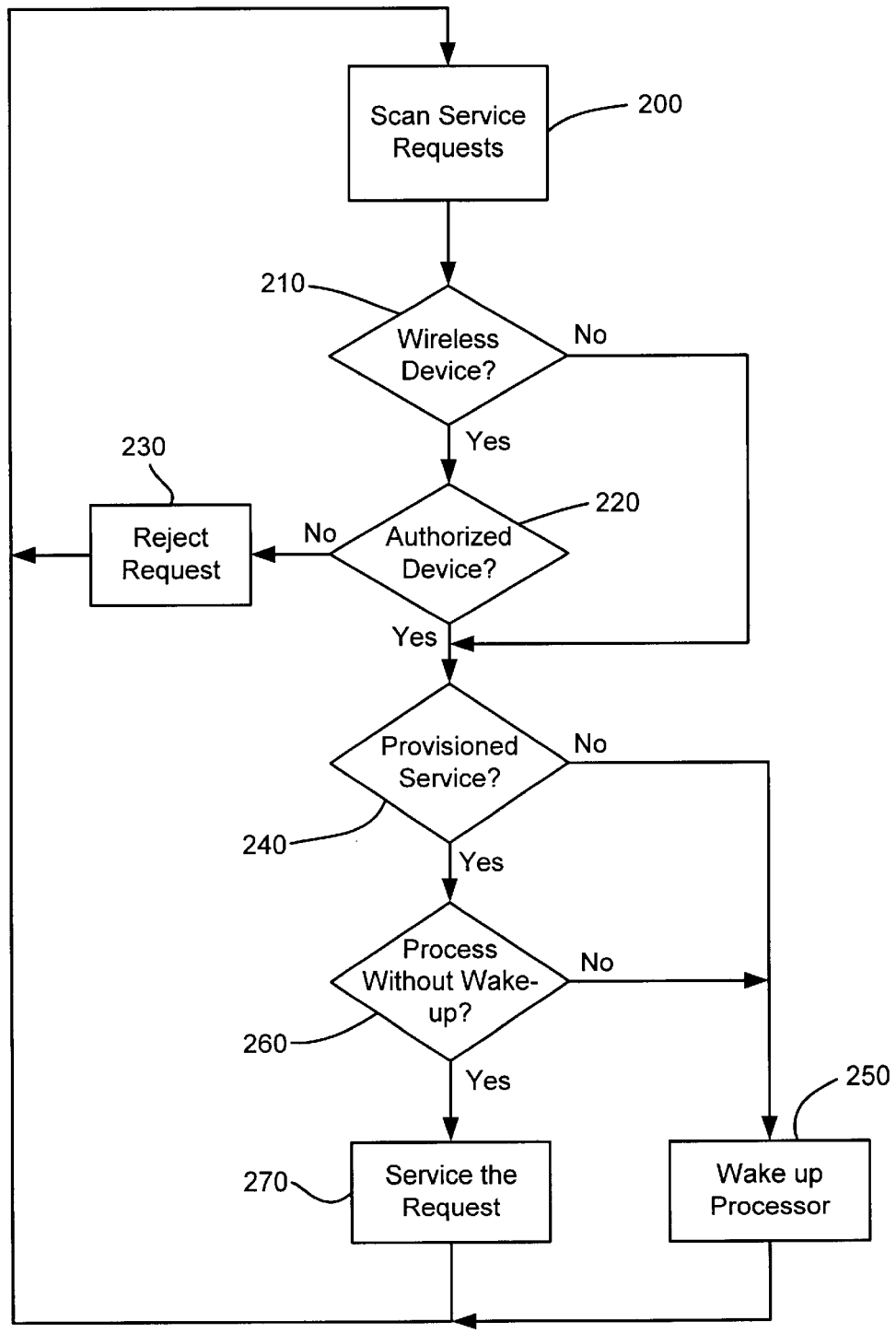
FIG. 2 is flow chart of steps taken by a PDA in response to a service request from a wireless peripheral device when the processor is in an inactive or a sleep mode

FIG. 2 illustrates a flow diagram of a process of pre-filtering service requests by PDA 160 according to one embodiment of present invention. A request for service is received by PDA 160 (step 200) from a radio control 180. The PDA 160 first determines if the request for service is a user define 'instant on' request or a service request from a wireless peripheral device (step 210). If the request is user defined 'instant on' type request then PDA 160 proceeds to check for provisioning (step 240). If the request is from a wireless device then PDA 160 determines if the device requesting service is an authorized device (step 220). If the device is not authorized to request service from or communicate with the computing system then PDA will reject the request (step 230).

If the device requesting service is one of the devices authorized in the database then PDA 160 determines if the service requested is one of the provisioned function (step 240). If the service requested is not one of the provisioned service then the PDA 160 will forward the request to the processor 110 and wakeup the processor 110 (step 250). The processor 110 then communicates with the device. If the request of service is one of the provisioned functions then the PDA 160 will determine if the request requires more resources then currently the PDA 160 can provide (step 260). An example of this type of request can be that a wireless LAN master requests certain data which the PDA 160 cannot access without the processor. Another example is that the request can be to access the hard drive, or after scanning email header, a user may want to access large attachment files etc. and such. If the processor 110 resources are required then PDA 160 will forward the request to the processor 110 and wake-up the processor 110. If the PDA 160 can perform the function without the processor 110 then the PDA 160 will service the request (step 270). All the functions of PDA 160 are performed in a low power mode and require limited system resources.

Figure 3:
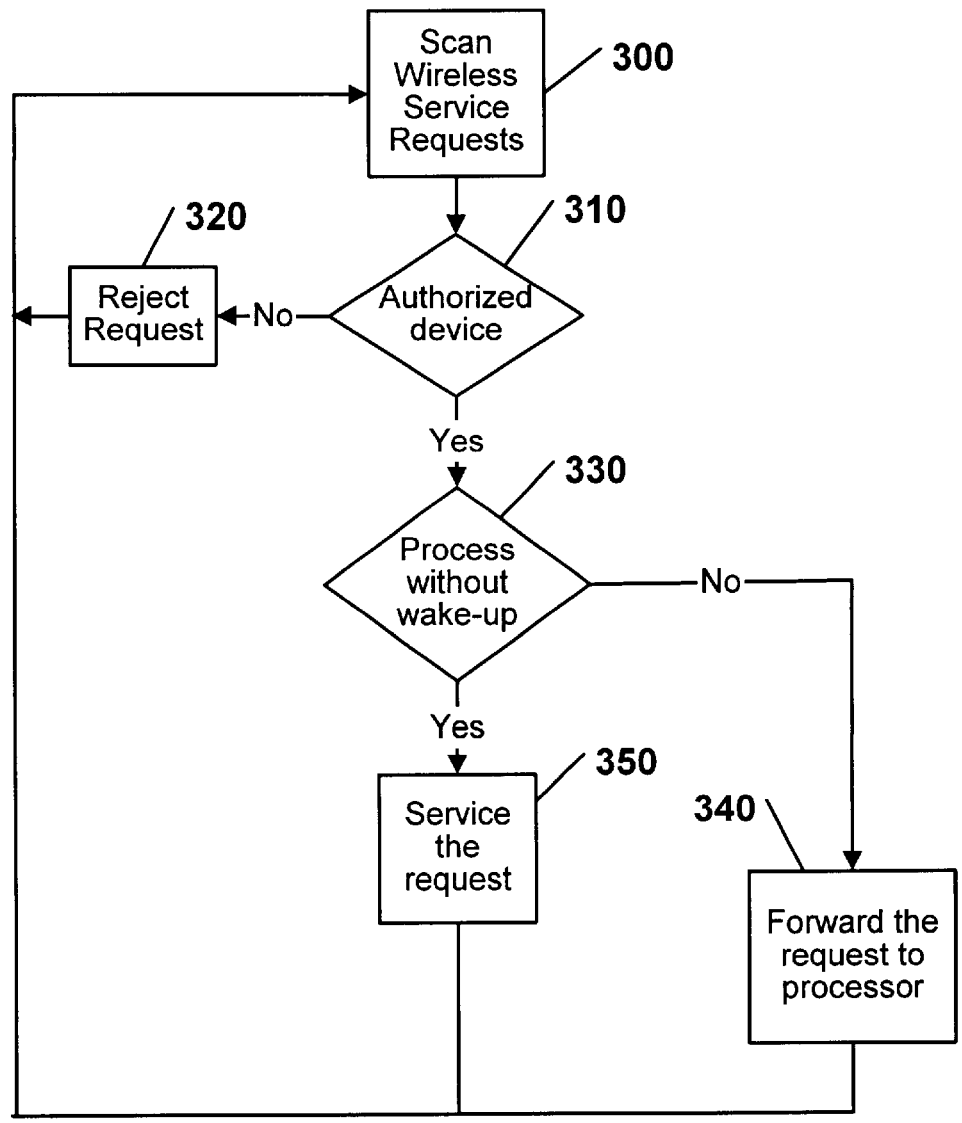
FIG. 3 illustrates a flow diagram of a process of servicing request when the processor is in an active state.

FIG. 3 illustrates a flow diagram of a process of servicing a request from a wireless device when the processor 110 is active and the computing system 100 is fully powered. The PDA 160 scans service requests from wireless devices received from the radio control 180 (step 300). When a request is received, PDA 160 will scan the lookup table 190 to check the identification of the wireless device and determines if the device is authorized to communicate with the computing system 100 (step 310). If the device is not authorized then the PDA 160 will reject the request (step 320) and no other system resources are used. If the PDA 160 finds a match in the lookup table 190 for device identification, means the device is an authorized device, then the PDA 160 proceeds to check if the service can be performed without the involvement of processor 110 (step330). If the PDA 160 cannot service the request then PDA 160 forwards the request to the processor 110 (step 340). If PDA 160 can service the request, then the PDA 160 will provide the requested service to the wireless device (step 350).

An example of service provided by the PDA 160 without the processor 110 involvement is peer-to-peer communication. PDA 160 can exchange preliminary data and information with wireless device without the processor 110. The user programs certain personal data such as email address, business card related information and such in PDA 160 which PDA 160 can exchange with peripheral wireless devices without the processor 110 involvement. PDA 160 periodically exchanges data with the processor 110 to update computing system's knowledge base regarding PDA 160 activities. As aforementioned, the extent of PDA 160 functionality will be based on the resources available in the computing system 100, PDA 160 and user's application needs.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of filtering and servicing events in a computer system, the computer system comprising a processor, the processor peripherals, a bus control switch operative with the processor, a personal digital assistant operative with the bus control switch, the personal digital assistant peripherals, a shared input/output controller operative with the bus control switch and the personal digital assistant, a plurality of input/output devices operative with the input/output controller, and a radio controller operative with the personal digital assistant, the method comprising:

provisioning filtering functions in the computer system;

receiving a request for service from a plurality of input/output devices by the personal digital assistant;

validating the request for service by the personal digital assistant;

determining resources required for the request for service; and performing the request for service.

2. The method of claim 1, further comprising:

identifying a plurality of resources of the computer system;

selecting an identifications of each one of the input/output devices;

selecting a plurality of functions;

selecting a priority for the plurality of functions; and storing the identifications of the input/output devices, the plurality of functions and the priority in a database in the personal digital assistant.

3. The method of claim 1, wherein:

the processor is in an inactive state, and the input/output devices are coupled to the computer system.

4. The method of claim 3, further comprising:

if the request for service requires a resource from the processor, notify the processor, and forwarding the request for service to the processor;

if the request for service does not require a resource from the processor, servicing the request for service.

5. The method of claim 1, wherein:

the processor is in an inactive state, and the input/output devices are wireless input/output devices.

6. The method of claim 5, further comprising:

receiving an identification from one of the wireless input/output devices;

locating the identification in the database;

if the identification is not located in the database, rejecting the request for service;

if the identification is located in the database, determining if the request for service requires a resource from the processor;

if the request for service requires the resource from the processor, awakening the processor, and forwarding the request for service to the processor; and if the request for service does not require a resource from the processor, servicing the request for service.

7. The method of claim 1, wherein:

the processor is in an active state, and the input/output devices are wireless input/output devices.

8. The method of claim 7, further comprising:

receiving an identification from one of the wireless input/output devices;

locating the identification in the database;
if the identification is not located in the database, rejecting the request for service;
if the identification is located in the database, determining if the request for service requires a resource from the processor;
if the request for service requires the resource from the processor, awakening the processor, and forwarding the request for service to the processor; and
if the request for service does not require the resource from the processor, servicing the request for service.

9. The method of claim 1, wherein:
the processor is in an active state, and
the input/output devices are coupled to the computer system.

10. A computer program product for filtering and servicing events in a computer system, the computer system comprising a processor, the processor peripherals, a bus control switch, a personal digital assistance operative with the bus control switch, the personal digital assistant peripherals, a input/output controller operative with the bus control switch and the personal digital assistant, a plurality of input/output devices operative with said input/output controller, and a radio controller operative with said personal digital assistant, the computer program product being encoded in computer readable media, the computer program product comprising:
a first set of instructions executable on the computer system, configured to provision filtering functions on the computer system;
a second set of instructions executable on the computer system, configure to receive a request for service from the plurality of input/output devices by the personal digital assistant;
a third set of instructions executable on the computer system, configured to validate the request for service by the personal digital assistant;
a fourth set of instructions executable on the computer system, configured to determine resources required for the request for service;
a fifth set of instructions executable on the computer system, configured to perform the request for service.

11. The computer program product of claim 10, wherein the first set of instructions comprises:
a first sub-set of instructions executable on the computer system, configured to identify a plurality of resources of the computer system;
a second sub-set of instructions executable on the computer system, configured to select an identifications of each one of the input/output devices;
a third sub-set of instructions executable on the computer system, configured to select a plurality of functions;
a fifth sub-set of instructions executable on the computer system, configured to select a priority for the plurality of functions; and
a sixth sub-set of instructions executable on the computer system, configured to store the identifications of the input/output devices, the plurality of functions and the priority in a database in the PDA.

12. The computer program product of claim 10, wherein:
the processor is in an inactive state, and
the input/output devices are coupled to the computer system.

13. The computer program product of claim 12, further comprising:

a sixth set of instructions executable on the computer system, configured to, if the request for service requires a resource from the processor, awaken the processor, and forward the request for service to the processor;
a seventh set of instructions executable on the computer system, configured to, if the request for service does not require a resource from the processor, service the request for service.

14. The computer program product of claim 10, wherein:
the processor is in an inactive state, and
the input/output devices are wireless input/output devices.

15. The computer program product of claim 14, further comprising:
a sixth set of instructions executable on the computer system, configured to, receive an identification from one of the wireless input/output devices, and locate the identification in the database;
a seventh set of instructions executable on the computer system, configured to, if the identification is not located in the database, reject the request for service;
an eighth set of instructions executable on the computer system, configured to, if the identification is located in the database, determine if the request for service requires a resource from the processor;
a ninth set of instructions executable on the computer system, configured to, if the request for service requires the resource from the processor, awaken the processor, and forward the request for service to the processor; and
a tenth set of instructions executable on the computer system, configured to, if the request for service does not require a resource from the processor, service the request for service.

16. The computer program product of claim 10, wherein:
the processor is in an active state, and
the input/output devices are wireless input/output devices.

17. The computer program product of claim 16, further comprising:
a sixth set of instructions executable on the computer system, configured to, receive an identification from one of the wireless input/output devices, and locate the identification in the database;
a seventh set of instructions executable on the computer system, configured to, if the identification is not located in the database, reject the request for service;
an eighth set of instructions executable on the computer system, configured to, if the identification is located in the database, determine if the request for service requires a resource from the processor;
a ninth set of instructions executable on the computer system, configured to, if the request for service requires the resource from the processor, notify the processor, and forward the request for service to the processor; and
a tenth set of instructions executable on the computer system, configured to, if the request for service does not require the resource from the processor, service the request for service.

18. A computer system, the computer system comprising:
a processor;
a plurality of processor peripherals operative with said processor;
a bus control switch operative with said processor;
a plurality of input/output devices operative with the bus control switch;

a personal digital assistant operative with the bus control switch;

a plurality of personal digital assistant peripherals operative with the personal digital assistant;

a radio control device operative with the personal digital assistant;

means for provisioning filtering functions in the computer system;

means for receiving a request for service from the plurality of input/output devices by the personal digital assistant;

means for validating the request for service by the personal digital assistant;

means for determining resources required for the request for service by the computer system; and means for performing the request for service by the computer system.

19. The computer system of claim 18, further comprising:

means in the computer system for identifying a plurality of resources of the computer system;

means in the computer system for selecting an identifications of each one of the input/output devices;

means in the computer system for selecting a plurality of functions;

means in the computer system for selecting a priority for the plurality of functions; and means in the computer system for storing the identifications of the input/output devices, the plurality of functions and the priority in a database in the PDA.

20. The computer system of claim 18, wherein:

the processor is in an inactive state, and the input/output devices are coupled to the computer system.

21. The computer system of claim 20, further comprising:

means in the computer system, if the request for service requires a resource from the processor, for awakening the processor, and forwarding the request for service to the processor;

means in the computer system, if the request for service does not require a resource from the processor, for servicing the request for service.

22. The computer system of claim 18, wherein:

the processor is in an inactive state, and the input/output devices are wireless input/output devices.

23. The computer system of claim 22, further comprising:

means in the computer system for receiving an identification from one of the wireless input/output devices;

means in the computer system for locating the identification in the database;

means in the computer system, if the identification is not located in the database, for rejecting the request for service;

means in the computer system, if the identification is located in the database, for determining if the request for service requires a resource from the processor;

means in the computer system, if the request for service requires the resource from the processor, for notifying the processor, and forwarding the request for service to the processor; and means in the computer system, if the request for service does not require a resource from the processor, for servicing the request for service.

24. The computer system of claim 18, wherein:

the processor is in an active state, and the input/output devices are wireless input/output devices.

25. The computer system of claim 24, further comprising:

means in the computer system for receiving an identification from one of the wireless input/output devices;

means in the computer system for locating the identification in the database;

means in the computer system, if the identification is not located in the database, for rejecting the request for service;

means in the computer system, if the identification is located in the database, determining if the request for service requires a resource from the processor;

means in the computer system, if the request for service requires the resource from the processor, awakening the processor, and forwarding the request for service to the processor; and means in the computer system, if the request for service does not require the resource from the processor, servicing the request for service.

26. The computer system of claim 18, wherein:

the processor is in an inactive state, and the input/output devices are coupled to the computer system.

* * * * *